(12) United States Patent
Westphal

(10) Patent No.: US 7,788,142 B2
(45) Date of Patent: Aug. 31, 2010

(54) SYSTEMS AND METHODS FOR PROVIDING COMMUNITY BASED CATALOGS AND/OR COMMUNITY BASED ON-LINE SERVICES

(75) Inventor: Geoffry A. Westphal, Park Ridge, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 0 days.

(21) Appl. No.: 12/203,243

(22) Filed: Sep. 3, 2008

(65) Prior Publication Data

US 2009/0216660 A1    Aug. 27, 2009

Related U.S. Application Data

(63) Continuation-in-part of application No. 12/036,574, filed on Feb. 25, 2008.

(51) Int. Cl.
*G06Q 30/00* (2006.01)
*G06F 17/30* (2006.01)

(52) U.S. Cl. .......................................... 705/26; 705/27
(58) Field of Classification Search .................. 705/26, 705/27
See application file for complete search history.

(56) References Cited

U.S. PATENT DOCUMENTS

| 7,266,516 | B2 | 9/2007 | Song et al. | |
| 7,313,536 | B2 | 12/2007 | Westphal | |
| 2003/0033215 | A1* | 2/2003 | Habiby et al. | 705/26 |
| 2003/0083959 | A1* | 5/2003 | Song et al. | 705/27 |
| 2004/0236640 | A1* | 11/2004 | Kassan | 705/27 |
| 2005/0171860 | A1* | 8/2005 | Westphal | 705/26 |

OTHER PUBLICATIONS

"Baseball Card Price Guide" (4th Edition). Maxymuk, John. Winter, 1990.*

* cited by examiner

*Primary Examiner*—Jeffrey A Smith
*Assistant Examiner*—Resha Desai
(74) *Attorney, Agent, or Firm*—Greenberg Traurig, LLP

(57) ABSTRACT

A buying community is established by discerning customers having the same or similar business types. The business type of a customer may be discerned from a keyword within a corporate, business, or other entity name that is associated with the customer or from purchasing interests commonly shared by customers. Once a buying community is established, behaviors of customers within that buying community are discerned. These behaviors may include product purchasing behaviors, on-line navigation behaviors, on-line searching behaviors, etc. The discerned behaviors of the customers within the buying community may then be used to provide catalogs customized for those members and/or on-line services customized for those members.

5 Claims, 2 Drawing Sheets

SYSTEMS AND METHODS FOR PROVIDING COMMUNITY BASED CATALOGS AND/OR COMMUNITY BASED ON-LINE SERVICES

RELATED APPLICATION INFORMATION

This application claims the benefit of and is a continuation-in-part of U.S. application Ser. No. 12/036,574, filed Feb. 25, 2008, which application is incorporated herein by reference in its entirety.

BACKGROUND

Systems and methods for providing customized information and services are known. For example, commonly assigned U.S. Pat. No. 7,266,516 describes systems and methods for providing customized, electronic catalogs and commonly assigned U.S. Pat. No. 7,313,536 describes systems and methods for providing customized product recommendations. It is also known to collect information, such as demographic information, firmagraphic information, historical purchasing information, etc., to provide such customized catalogs, customized product recommendations, and/or other customized services.

SUMMARY

To provide community based catalogs and/or community based on-line services a buying community is established. Generally, the buying community is established by first discerning customers having the same or similar business types. The business type of a target customer, e.g., a current or potential customer, may be discerned from a corporate, business, or other entity name that is associated with the customer. Once a buying community is established, behaviors of customers within that buying community are discerned. These behaviors may include product purchasing behaviors, on-line navigation behaviors, on-line searching behaviors, etc. The discerned behaviors of the customers within the buying community may then be used to provide catalogs customized for those members and/or on-line services customized for those members.

A better understanding of the objects, advantages, features, properties and relationships of the systems and methods described hereinafter will be obtained from the following detailed description and accompanying drawings which set forth illustrative embodiments.

BRIEF DESCRIPTION OF THE DRAWINGS

For a better understanding of the systems and methods for providing community based catalogs and/or community based on-line services described hereinafter, reference may be had to preferred embodiments shown in the following drawings in which.

DETAILED DESCRIPTION

Figure 1:
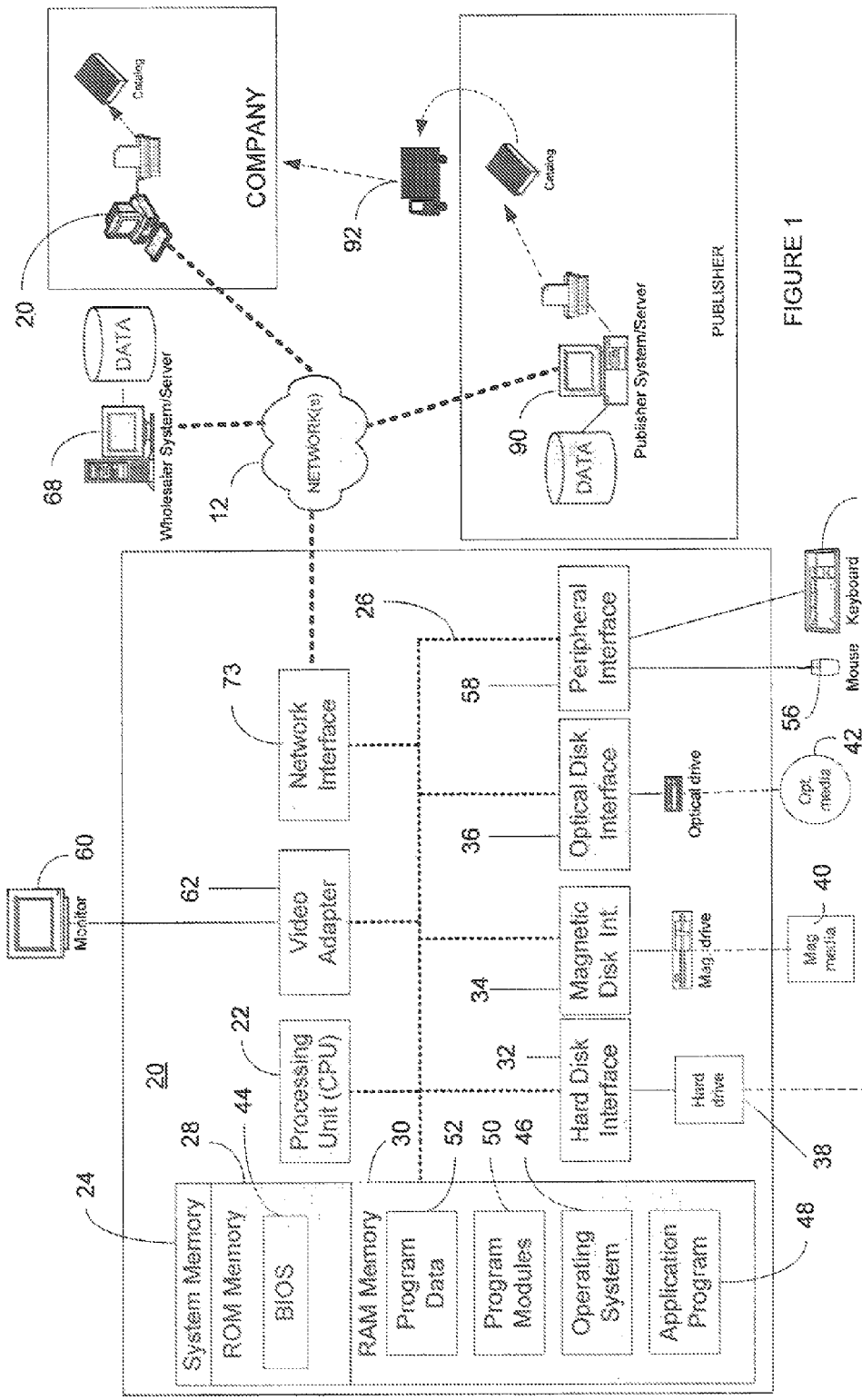
FIG. 1 illustrates a block diagram of an exemplary system in which the inventive concepts may be employed.

Turning to the drawings, wherein like reference numerals refer to like elements, exemplary systems and methods for providing community based catalogs and/or community based on-line services are hereinafter described. As illustrated in FIG. 1, an exemplary system in which the subject inventive concepts may be employed includes a processing device 20, illustrated in the exemplary form of a computer system, that is provided with executable instructions to, for example, provide a means for a customer to access a web site via a computer system/server 68 and thereby browse goods offered for sale by a wholesaler, retailer, vender, etc., (collectively "wholesaler") in particular goods set forth in a catalog or otherwise presented on-line in a manner that has been customized for that customer, purchase goods of interest, request delivery of goods, etc. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant (PDA), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of well known bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules, i.e., computer executable instructions, may be stored in one or more of the memory/media devices of the processing device 20. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52.

Still further, computer-executable instructions may be downloaded to the processing device 20 as needed, for example, via a network connection.

The customer may enter commands and information into the processing device 20 through input devices such as a keyboard 54 and/or a pointing device 56. While not illustrated, other input devices may include a microphone, a joystick, a game pad, a scanner, etc. These and other input/output devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As further illustrated in FIG. 1, the processing device 20 may also utilize logical connections to one or more remote processing devices, such as the wholesaler system/server 68. The remote processing devices may have an associated data repository in which is stored data such as customer/company information, electronic catalog pages, etc. While the remote processing device 68 has been illustrated in the exemplary form of a server computer, it will be appreciated that the remote processing devices 68 may be any type of device having processing capabilities. As such, it will again be appreciated that the remote processing device 68 need not be implemented as a single device but may be implemented in a manner such that the tasks performed by the remote processing device 68 are distributed to a plurality of processing devices linked through a communication network For performing tasks as needed, the remote processing device 68 and other processing devices illustrated in FIG. 1, such as publisher system/server 90, may include many or all of the elements described above relative to the processing device 20. Communications between the processing device 20 and these additionally illustrated processing devices may be exchanged via a further processing device, such a network router, that is responsible for network routing. Communications with the network router may be performed via a network interface component 73. Thus, within such a networked environment 12, e.g., the Internet, World Wide Web, LAN, or other like type of wired or wireless network, it will be appreciated that program modules depicted relative to the processing device 20, or portions thereof, may be stored in the memory storage device(s) of one or more of these additionally illustrated processing devices.

As illustrated in FIG. 1 and as noted above, a customer generally interacts with wholesaler system/server 68 to browse an electronic catalog of goods offered for sale by the wholesaler, to order/purchase goods of interest, to request delivery of such goods, etc. In connection with the customer accessing the wholesaler system/server 68, the wholesaler system/server 68 may be used to collect customer information that may be further used to provide the customer with a customized catalog and/or customized on-line services. More particularly, the wholesaler system/server 68 may collect customer information such as bill-to address(es), ship-to address(es), credit limit(s), contact name(s), phone number(s), the name of the company, corporation, or entity (collectively "company name") with which the customer is associated, prior purchasing history, etc. Such information may be provided directly by the customer, a wholesaler representative for the customer, or gleaned from prior transactions/interactions by the customer with the wholesaler system/server 68. As will be appreciated, such information may be stored within the data repository associated with the wholesaler system/server 68.

Information gathered for a particular customer may then be utilized to prepare or otherwise make available, for example on-line, a catalog of products and/or services (collectively "products") where the catalog of products is customized for that customer. More particularly, a catalog of products may be customized for a customer by utilizing the company name associated with the customer. In this regard, it is to be understood that a company name, in many cases, very accurately describes a type of business. For example, it can be assumed with a high degree of certainty that a company of the name "ABC Plumbing" is a plumbing business, a company of the name "Vivorah's Bakery" is a bakery business, a company of the name "Lincoln Park Supermarket" is a grocery business, etc. Thus, with this knowledge, it is possible to group very specific businesses into a precise market segment, or community, to thereby provide a catalog of products customized for customers within that community. It will also be appreciated that communities discerned in this manner are likely to be very homogenous and, as such, will likely share behaviors and have very similar product needs. Yet further, it will be appreciated that providing customizing catalogs with this degree of community specificity is more likely to result in sales by the wholesaler as it is more likely that a customized catalog will include products that are attractive to and/or needed by the customer to which the customized catalog is targeted. For example, a customer in the bakery business is likely to have very specific product needs which product needs might be obscured in a more general catalog, such as a general catalog having all products sold by the wholesaler or even a general catalog having products tailored for a more generic industry classification, such as food processing.

Figure 2:
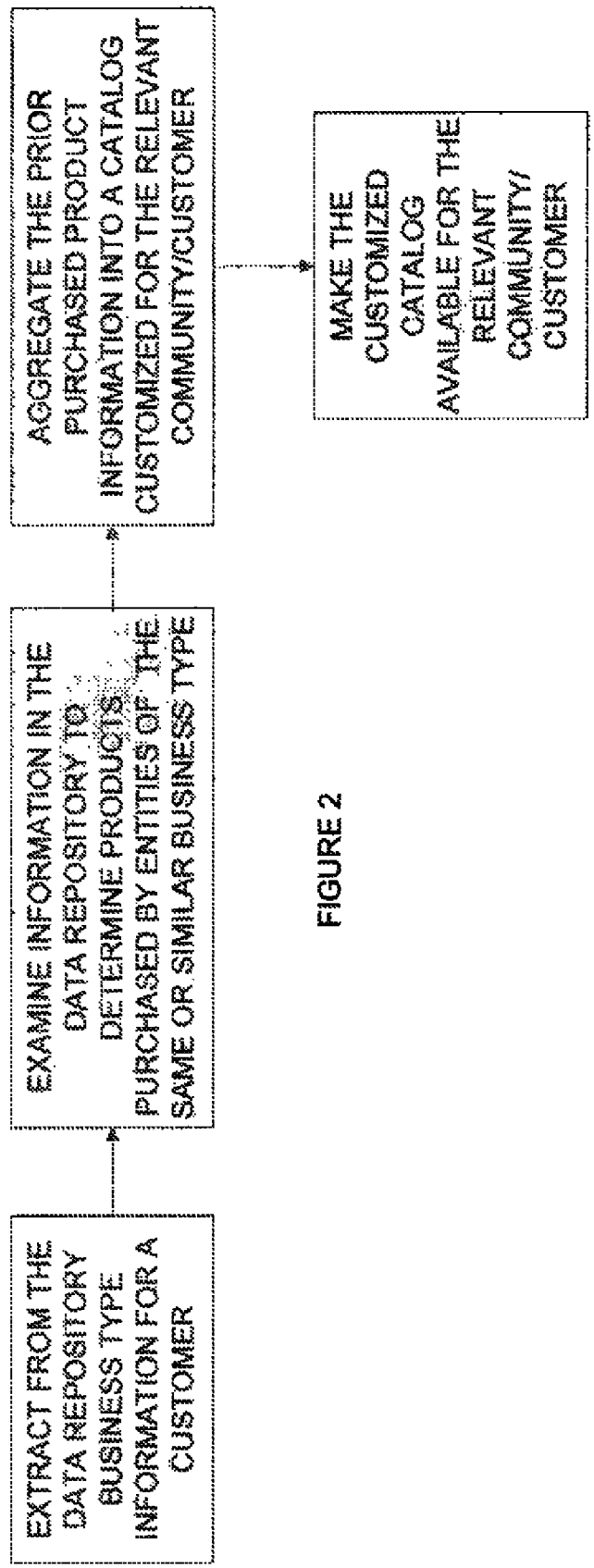
FIG. 2 illustrates a flow chart diagram of an exemplary method for providing a customized catalog for a relevant community and/or customer.

With reference to FIG. 2, a community specific catalog may be customized for a customer by first extracting from the data repository business type information that is within the company name information for that customer. The business type information to be used in this process may vary in level of detail and, accordingly, may be used as desired. For example, the company name information may include only one level of business type detail, such as "Bakery" in "Anita's Bakery," or multiple levels of business type detail, such as "Vineyard" and "Winery" in "Napa Valley Vineyard and Winery." Then, using the business type detail(s) extracted, the data repository is examined to determined what products have been purchased in the past from the wholesaler by companies in the same, or similar, business type—again discernable by using information contained within company name data and examining prior purchasing histories of companies having a company name with the same, or similar, business type detail as the customer for which a customized, community catalog is being created. The prior purchasing histories considered may be constrained to a predefined period of time, such as within the last month, within the last year, etc., a predetermined period of time within a year, e.g., a season, a month, etc., or the like, a predetermined period of time before or after an event, e.g., a snow storm, a hurricane, etc. Furthermore, a customized catalog for a community may include all products that have been determined by the system to have been purchased from the wholesaler (within a time period if applicable) by companies determined to be within the relevant community, only a subset of the products so determined, e.g., products that meet a predetermined sales threshold such as having been sold X number of times within the community, additional products, while not determined as being purchased by companies within the relevant community, are known to be often sold-with the products so deterimed when considering other customers beyond the relevant community (such "sold-with" products being identified, for example, using the methods described in commonly assigned U.S. Published Application No. 2005/0171860 or those described in U.S. Pat. Nos. 6,317,722 and 6,064,980), and the like. Still further, the customized catalog may include products in addition to the products determined in the above described method by merely aggregating pages from an existing catalog, such as pages from the W.W. Grainger, Inc's catalog, on which appear the products discerned to the purchased by companies within the relevant community.

The customized, community catalog may be further customized as desired. For example, if a customer's business type is discerned to be "vineyard" and "winery," products to be included within the customized, community catalog may be limited to those purchased from the wholesaler by only "vineyard" type businesses, those purchased only by "winery" type businesses, those purchased by both "vineyard" type businesses and "winery" type businesses, or those purchased only by "vineyard and winery" type businesses. Thus, it is seen that a business type identifier for a customer can be excluded from consideration when establishing a relevant, customized community catalog for that customer. By way of further example of such exclusion, a customer in the "heating and plumbing" business type, e.g., "Fred's Heating and Plumbing," may desire to be provided with the relevant community catalog for the "heating and plumber" type community as opposed to being provided with the relevant community catalog for either the "heating" type community or the "plumbing" type community. Still further, by this example it will be appreciated that the system and method may consider variations, synonyms, and related business types when determining relevant community inclusion and/or purchasing activities. In this manner, company names such as "plumber," "plumbing," "plumbers," "sewer," "heating," "septic," and the like may all be deemed by the system to belong to the "heating and plumbing" type business community.

Once a customer is discerned by the system as belonging to a community and a relevant customized community catalog exists (or can be created) for that community, the customer may access an electronic version of the catalog, receive a print version of the catalog, etc. The electronic version of the customized community catalog can be viewed on line by, for example, accessing the wholesaler system/server 68 from a computing device 20. The electronic version of the customized community catalog may be provided in any appropriate form. Still further, the electronic version of the customized community catalog may be made available by the wholesaler for downloading to a computer 20 of the customer (or via distribution on a storage media such as a CD, memory stick, or the like) for local access/printing by the customer. The customized community catalog may similarly be provided to a publisher system/server 90 for printing and distribution through conventional means, such as mail, to the customer. Still further, the customized community catalog may be provided as a stand-alone catalog, e.g., as a mailer, magalog, etc., or included as a component part of a larger catalog. For example, a customized community catalog may be included as a component part of the general W.W. Grainger, Inc. catalog such as by being included in the front, back, or its own subsection of the W.W. Grainger, Inc. catalog. The pages of the customized community catalog may also be arranged as desired, for example by placing at the front of the customized catalog those products most often purchased by companies within the relevant community.

In a further embodiment of the system and method, the business type for a customer/user of the wholesaler system/server 68, again discerned from the company name information captured about that customer, may be utilized to improve on-line product search services. For example, using the methods discussed above, the business type of a customer may be discerned and a relevant corpus of products identified for that customer, i.e., products typically purchased by the relevant community to which the customer belongs as indicated by their business name. Then, in response to a customer performing a general search for a product, such as a keyword, drill down, or other type of search for "hammers," the system may present to the customer the search results with the hammers most often purchased by the relevant community to which the customer belongs emphasized. In this regard, the emphasis may be provided by biasing those searched for products most often purchased by the relevant community to a predefined location within the search results, such as at the top, by providing a ranking indicator with the search results, e.g., "this product purchased by 90% of your community," by excluding from the search results those searched for products not typically purchased by the relevant community, by highlighting those products within the search results that are typically purchased by the relevant community, or the like. This method may also be utilized to filter product search results provided in response to the user searching for a product by means of a cross-reference, e.g., a user in the "plumbing" type business searching on a model no. "ABC 123" may be presented with search results that include only those products cross-referenced to "ABC 123" that are also determined to be relevant to the "plumbing" type community.

In the instance where searches are performed using on-line drill-down searching services or on-line parametric searching services (as disclosed in, for example, commonly assigned U.S. Published Application No. 2007/02066146 and U.S. Published Application No. 2006/0287986), the subject system and method may be utilized to pre-filter options that are made available to a customer based upon their discerned community and the purchasing history of the relevant community. For example, if the customer is discerned to be in the "HVAC" business type community, when the user begins an on-line category drill-down search to find a product, the customer may be presented with only those categories, subcategories, and ultimately products from which the HVAC business type community, collectively, has historically purchased. Similarly, if the customer is discerned to be in the "HVAC" business type community, when the user uses an on-line parametric search, i.e., a "selection guide," to find a product, the customer may be presented with only those parametric values that are relevant to products from which the HVAC business type community, collectively, has historically purchased. As with the process for creating customized community catalogs, it is contemplated that a customer may have one or more relevant communities that may be individually or collectively used to pre-filter options that are made available to a customer in such on-line searches.

It will also be appreciated that the customized information provided to a customer, whether on-line or within a printed catalog, may reflect an arrangement of information that is preferred by the relevant community. In this regard, to the extent that product information is presented in tables or is otherwise arranged such that product attribute information is readily viewed for use in performing product comparisons, the product attribute information may be arranged in a manner that reflects its discerned usefulness to the relevant community. By way of example, customer interactions with rearrangeable product attribute tables (such as by dragging/ dropping or otherwise repositioning tabular columns in which are maintained specific attribute information, such as size, power, etc.) may be tracked whereupon, through analysis of the frequency of the interactions, it may be discerned that certain table arrangements are desired for certain communities and these discerned arrangements may then be reflected in customized catalogs as noted above.

In a yet further embodiment of the system and method, the business type for a customer/user of the wholesaler system/server 68, again discerned from the company name information captured about that customer, may be utilized to improve on-line product recommendation services. For example, products recommended to a customer in the performance of on-line activities, such as described in commonly assigned U.S. Published Application No. 2006/0036510, may be further filtered to ensure that only products known to be sold within the relevant community are included as recommended products.

In a still further embodiment of the system and method, the business type for a customer/user of the wholesaler system/server 68, again discerned from the company name information captured about that customer, may be utilized to improve on-line product information services. In this regard, it is contemplated that users of the system may be provided with the ability to provide commentary, annotations, etc. for products, services, etc. offered by the wholesaler. Furthermore, such commentary, annotations, etc. may be specified to be community specific, for example by being designated as belonging to a community, by being assigned to a community based upon the identity of the provider of the commentary, etc., whereupon a customer accessing the wholesaler system can be exposed to the commentary, annotations, etc. that have been provided by their relevant community. In this example, it is to be appreciated that such commentary, annotations, etc. can be mapped to catalog pages (within the general catalog or a custom community catalog), to catalog page tables, to individual products, etc. without limitation. Thus, by this service, a customer in the "painter" business type viewing paint brush products might be exposed to (or otherwise be able to view) comments provide by the "painter" business type community that might address how the brush stands up to certain paint applications while a customer in the "music and sound" business type community, when viewing the same paint brush products, might be exposed to (or otherwise be able to view) comments provided by the "music and sound" business type community that might address how the brush stands up to use in cleaning keyboards.

In a yet further embodiment of the invention, a catalog customized for a relevant community may be utilized to stock a tool crib for a company. For example, a company starting out in the "airline" business, which may have no experience in tool crib stocking, may have their tool crib initially stocked with the items that are found within the catalog that has been customized as described hereinabove for the "airline" type business. Similarly, a sales representative may utilize a customized catalog to familiarize themselves with the purchasing behaviors of the buying communities that the sales representative commonly interacts with.

Additional methods for discerning members of a relevant community are additionally contemplated. By way of example, the buying history of customers may be examined to discern customers that purchased the same or similar items. Those customers that have purchased the same or similar items may then be placed into a results table or list which would include, among other information, data indicative of the company name for each customer so grouped together. The data indicative of the company name for each customer may then be examined for the purpose of further discerning patterns in the data indicative of the company name for customers that have purchased the like or similar items. By way of example, it may be discerned from the data collected for customers that have purchased the same or similar items that a similar keyword, such as "bakery," appears a statistically relevant number of times within the data indicative of the company name for each customer grouped in this manner. Using this statistically significant information, it can be concluded that other customers that have the discerned, statistically relevant keyword in their company name (in this example "bakery") are likely to share similar product needs for similar application needs as does the community from which the relevant keyword was discerned as described above. As such, other customers that have the discerned, statistically relevant keyword in their company name (or as otherwise provided by that customer) can be recommended or offered one or more items, such as in a catalog or via webpages, from the same or similar items that led to the grouping that resulted in the keyword identification as discussed above with a degree of certainty that such item(s) will be relevant to and likely purchasable by that other customer.

It is similarly contemplated that customer communities may be discerned by presenting to customers a list of products or categories of products that a vendor sells. The customer may then be asked to select only a smaller number of those products or categories that they would be interested in. For example, a customer may be asked to select a small number of products or categories of products the customer would like to receive discounts for as a customer would be more likely to share this information in return for the given incentive and, moreover, it would ensure that a customer is most likely to prioritize their choices accurately. The results across multiple customers can then be examined and those customer that substantially share the same selected products or categories of products can be treated as a community, at least until more information is known about each customer, such as through actual purchasing patterns.

While the above described methods attempt to discern for a given community the most likely relevant items and/or catalog pages to include within a catalog that is customized for that community, it is recognized that some communities may have a relatively small number of customer members. In such a case, it is also recognized that the small print run that would be required to print a customized catalog for the small number of customer members within such a community may be cost prohibitive. Accordingly, it is contemplated that the list of relevant items and/or catalog pages for plural small communities of customer members that have a predetermined number of relevant items and/or catalog pages in common could be combined to thereby product an aggregate customized catalog for those combined communities. The resulting aggregate customized catalog may introduce a small, but acceptable, level of items and/or catalog pages that might be irrelevant to one or more of the individual communities within the combined communities, however by collecting the items and/or catalog pages across the combined communities will allow for a larger print run and, therefore, a correspondingly lower and acceptable cost per catalog. By way of example, if the communities of mushroom farmers, vineyards, and herb gardeners each share a substantial number of items and/or catalog pages in their respective catalogs, the items and/or catalog pages from these respective catalogs can be combined into one aggregate, customized catalog. With a slight increase in printing costs, it will be additionally appreciated that an aggregate, customized catalog can be provided with plural, distinct covers that are each appropriate for a particular one of the grouped communities to which the aggregate, customized catalog is to be distributed.

While specific embodiments of the invention have been described in detail, it will be appreciated by those skilled in the art that various modifications and alternatives to those details could be developed in light of the overall teachings of the disclosure. For example, in the event that the business type for a customer/user of the wholesaler system/server 68 cannot be discerned from company name information captured about that customer (or the customer is an anonymous user) the system may allow the customer/user or service representative for the customer/user to specify a community, such as from a list of communities previously identified by or otherwise established within the system, and this specified community may then be utilized to provide that customer with the various service hereinabove described. Similarly, if the system maintains standard industrial classification (SIC) information for customers/users, the SIC information may be used in conjunction with or in lieu of the company name information to provide community customized catalogs and services as hereinabove described. The system may also provide for a user/customer to select a community to thereby allow the user/customer to take on one of multiple different personas, for example, a centralized buyer for a large organization may desire to have access to a "plumbing" business type customized catalog and/or services during one on-line session when acting on behalf of one area of the company and have access to a "cleaning" business type customized catalog and/or services during another on-line session when acting on behalf of another area of the company. Furthermore, while community prior purchasing history has been used in the examples above to discern products for creating customized community catalogs and providing customized on-line services, it is to be appreciated that other community attributes, such as web pages visited, products searched for, etc., may be similarly used to discern products for creating customized community catalogs and for providing customized on-line services. Accordingly, the particular arrangement disclosed is meant to be illustrative only and not limiting as to the scope of the invention which is to be given the full breadth of the appended claims and any equivalents thereof.

All patents, patent applications, and other references cited within this document are hereby incorporated by reference in their entirety.

What is claimed is:

1. A computer readable media embodied in a physical storage device having stored thereon computer executable instructions for recommending items to a potential customer of a wholesaler, the instructions performing steps comprising:

identifying from company name information of the potential customer one or more keywords of business type detail that is found within the company name associated with the potential customer;

identifying from company name information of multiple customers one or more keywords of business type detail that is found within the company name associated with the multiple customers, wherein the multiple customers are determined to be of the same or similar business type of the potential customer using the company name information;

extracting from a database of the wholesaler, information indicative of one or more items purchased from the wholesaler by the multiple customers determined to be of a similar or same business type of the potential customer; and recommending the one or more extracted items to the potential customer for purchase.

2. The computer readable media as recited in claim 1, wherein the instructions perform a further step comprising examining prior purchasing histories of each of the multiple customers having the keyword in their company name data and additionally recommending to the potential customer one or more products commonly found in the prior purchasing histories of the multiple customers having the keyword in their company name data.

3. The computer readable media as recited in claim 2, wherein the instructions perform a further step comprising aggregating the item and the one or more products into a catalog customized for the potential customer.

4. The computer readable media as recited in claim 3, wherein the instructions perform a further step comprising causing the catalog customized for the potential customer to be printed.

5. The computer readable media as recited in claim 3, wherein the instructions perform a further step comprising causing the catalog customized for the potential customer to be provided in an electronic form.

* * * * *